Patented Nov. 5, 1935

2,019,981

UNITED STATES PATENT OFFICE 2,019,981

METHOD AND COMPOSITION FOR PRODUCING A COLD GLAZE ON BUILDING MATERIALS AND THE LIKE

Victor P. Krauss, Flushing, N. Y., assignor to American Kerament Corporation, New York, N. Y., a corporation of Delaware No Drawing. Application March 5, 1932, Serial No. 597,095

6 Claims. (Cl. 91—68)

The present invention relates to a glazing composition and method of making, and more particularly to a composition and process for glazing building materials and the like, without the application of high temperatures.

Building materials such as ceramic products, including tile and stone compositions, are usually glazed by coating them with a mixture of materials and then subjecting the materials to high temperatures to vitrify the coating. The most serious objection to this method is the cost of the necessary equipment, namely kilns wherein the articles are fired, as well as the cost of operating the kilns. Processes commonly referred to as cold glazing, wherein the glaze is produced without the use of high temperatures, have been developed, but these have not been entirely satisfactory. Cold glazes utilized heretofore require a substantial period of time, for example, a week or more, to attain a satisfactory glaze coating having characteristics of durability and hardness. The substances used in these compositions have a tendency to retard the hardening process and thus extend the time required to fabricate the products to which the glaze is applied. Accelerators have been tried but are not satisfactory because of their action on emulsions utilized in the glazing compositions, and their tendency to depart from the required uniformity of surface texture and color. Since most of the glazes are colored, standard accuracy of shade and pattern must be given particular attention.

The present invention aims to overcome the above difficulties by providing a cold glazing composition having constituents therein adapted to allow rapid hardening of the glaze and, at the same time, produce a surface with a high gloss. The new composition forms a suitable glaze coating for building materials and is particularly applicable to cement tiles, building blocks, and the like.

An object of the present invention is to provide a less expensive composition and process for glazing building materials and the like.

Another object of the invention is to provide a glazing composition adapted to harden rapidly to form a durable coating.

Another object of the invention is to provide a more rapid process for glazing building materials and the like, whereby the rate of production can be greatly increased.

A further object of the invention consists in simplifying the process for manufacturing the glazing composition and applying the same to building materials, and the like, whereby the foregoing objects or advantages will be attained.

Other and further objects of the invention will be obvious upon an understanding of the illustrative embodiment about to be described, or will be indicated in the appended claims, and various advantages not referred to herein will occur to one skilled in the art upon employment of the invention in practice.

In order to understand the present invention more clearly, the components of the glazing composition may be classed in three groups. The first group includes cement substances such as Portland cement and high alumina cements, natural, pozzulan, and slag cements, Keene's cement, and other inorganic cement materials. The second group comprises substances that are not directly essential to the production of a glaze surface, but are advantageous and desirable for various reasons. These include different forms of silica, and siliceous compounds, inorganic substances insoluble in water, pigments and coloring matter. The third group is designated herein as a mixing liquid which is introduced as a vehicle for the above solids, and consists of water containing the various substances which will be described hereinafter.

I have discovered a method of using a class of compounds which are effective in producing a high gloss glaze and more rapid hardening. These compounds may be formed by the combination of a metal with the acids found in many of the natural resins which, when precipitated in finely divided form and dispersed in the glaze mixture, are very adaptable to the present process. Most of the resins contain relatively large amounts of non-saponifiable matter and are comparatively expensive. However, excellent results are obtained by using colophony or rosin, and either type of these known as gum or wood rosin, or extracted rosin. These rosins are available at a permissive cost, and readily combine with metals to form metal-resin-acid compounds, which are commonly known as resinates.

The selection of the metal allows a wide latitude and actually excludes only those metals which form soluble resinates, as those of the alkali metal group, for example, sodium or potassium. For industrial application, where cost, availability, peculiarity of reaction, and specific characteristics are important, I have found that aluminum, barium, cadmium, calcium, iron, lead, manganese, and zinc give satisfactory results, but other metals may be used if they come within the above qualifications.

Some precipitated resinates are found on the market in dry pulverized form, such as the resinates of calcium, cobalt, copper, lead, manganese and zinc. These may sometimes be used for the mixing liquid hereinafter described, by observing the following cautions. The powder is often lumpy or contains aggregates of sufficient size, although small, to be objectionable if not eliminated. The resinate should be soft and free from substantial amounts of soluble salts and other impurities or adulterants. The best method is to mix and grind the resinate with the dry cement components of the glaze. Fine and soft grades may be pulped and mixed with water, preferably in an efficient agitator, and ground while in a moist condition. In the latter instance, I prefer to add a small amount of ammonium tannate, or other suitable dispersing agent, which improves both the effectiveness of the pulping operation, as well as the quality of the finished glaze mixture. Where the resinates are manufactured in the plant where they are to be used, other forms of resinates which are not found on the market can be used. Since drying and preparing the resinate into marketable condition are eliminated, special attention can be directed to the particle size and texture of the resinate.

The rosin may be saponified with alkali such as caustic soda solution, in the conventional manner. Precipitation of the insoluble resinate is best carried on in a tank equipped with a mechanical agitator, whereby thorough mixing of the particles and complete reaction is obtained. The rosin soap is then diluted to a concentration of between five and ten per cent, and a dispersing agent such as an ammonium salt of an organic acid may be added thereto. A solution of a like concentration of a metallic salt, preferably the chloride of the metal chosen, is then slowly added while the soap solution is being agitated. I have found that, in order to obtain the best results, the solution should be cold or not over eighty degrees Fahrenheit, and the salt solution should be calculated to give a slight excess above the theoretical quantity necessary to carry out the reaction. The resulting precipitated resinate is then washed to remove the by-product salts, and, for present purposes, this may be done by decantation. Filtration may be employed, and the materials may be thereafter pulped and diluted to required concentration.

It may happen that the resulting precipitate, in some instances, is more dense or coarser than required for best results, but this can be improved by the addition of a dispersing agent, such as ammonium tannate, ammonium oleate, or similar substances. Where the precipitate is of insufficient fineness, it may be passed through a colloid mill or the glaze compound may be mixed more energetically and, if desirable, for a longer period. The best results, however, are attained by carrying on precipitation in the presence of the dispersing agent which may be added to the alkali soap solution before adding the salt of the metal.

After the resinate has been prepared, the amount of water in which it is suspended is adjusted so that the concentration of the solids therein amounts to approximately one ounce in a gallon. To this, about one-tenth to one-twentieth of an ounce of dispersing agent, on a dry basis, may be added. Although a small amount of dispersing agent is added prior to the precipitating and washing operations, and adsorbed by the particles of the mixture, I prefer to add one per cent of dispersing substance to the finished liquid mixture.

The above constitutes the mixing liquid with which the cement particles, coloring matter, and other substances are mixed, to provide a slurry used for glazing. The weight of the solids forming one gallon of mixing liquid, allows for variation, and I do not confine myself to the exact figures given in the above illustration. Nor should this be taken to specify the use of only a single resinate in the liquid, since I have found that two or more metals may be used in combination, either by successive precipitation in the same batch operation, or by mixture after formation.

The glaze may be applied to building material by means of known operations such as dipping, brushing or spraying. When applied by dipping, it is advisable to run an agitator in the glaze bath to maintain uniformity of the mixture, although frequent stirring is advisable and should be observed in carrying out other methods of application. After the glaze has been applied, the articles are stored in a curing chamber to induce setting and hardening of the glaze. By reason of the beneficial behavior of the metallic resinate, the period required for setting or hardening is substantially decreased. The metallic resinates and organic ammonium salts cooperate to facilitate both dispersion of the particles and rapid hardening of the glaze. The accelerating agent is not affected adversely by the dispersing agent.

It will be seen that the present invention provides an inexpensive compound for glazing building materials and the like, and a simple process for manufacturing and applying the same. The metallic resinate facilitates the setting of the glaze, whereby the products can be manufactured more rapidly and orders can be filled upon short notice. Likewise, the amount of products to be kept in stock or storage, is greatly decreased and the production capacity can be increased without additional space or apparatus. The active materials utilized herein do not adversely affect the other substances in the glaze, such as the coloring matter, but combine favorably therewith. The resulting glaze coating is very glossy, impervious to moisture, and resistant to wear and weathering.

Various changes may be made in the proportions of the ingredients and in the procedure enumerated above, and as various equivalents may be substituted for those named above and other methods may be utilized, without departing from the scope of the present invention, as defined in the claims, it is desired that the above description be understood as illustrative and not in a limiting sense.

Having thus described my invention, I claim:

1. The method of producing a rapid hardening glaze coating on building material without the use of high temperatures, which method comprises mixing pulverized cement material with a finely divided substantially water-insoluble precipitated resinate formed in the presence of and containing ammonium tannate and suspended or dispersed in water, and coating the building material with said mixture, said resinate facilitating rapid hardening of the glaze.

2. The method of producing a glaze coating on building material and the like, which method comprises mixing pulverized cement material, and quartziferous substances with a mixture consisting of finedly divided precipitated resinate substantially insoluble in water, formed in the presence of and containing ammonium tannate and suspended or dispersed in water, and coating the building material with the resulting mixture, said resinate facilitating rapid hardening of the glaze.

3. As an article of manufacture, a building material coated with a cold glaze, said glaze comprising pulverized cement material, quartziferous substances, a finely divided water insoluble precipitated resinate adapted to cause rapid hardening of the glaze, and ammonium tannate adapted to disperse the particles of the glaze.

4. As an article of manufacture, a building material coated with a cold glaze, said glaze comprising pulverized cement material, a finely divided water insoluble precipitated resinate adapted to cause rapid hardening of the glaze, and ammonium tannate adapted to disperse the particles of the glaze.

5. A glazing composition comprising pulverized cement material, a finely divided water insoluble, precipitated resinate adapted to cause rapid hardening of the glaze and ammonium tannate adapted to disperse the particles of the glaze.

6. A glazing composition adapted to be used without high temperatures, comprising pulverized cement material, quartziferous substances, a water insoluble precipitated resinate adapted to cause rapid hardening of the glaze and ammonium tannate adapted to disperse the particles of the glaze.

VICTOR P. KRAUSS.